United States Patent [19]
Asmar

[11] 3,912,997
[45] Oct. 14, 1975

[54] BIAS AND SCALE FACTOR TEMPERATURE COMPENSATION NETWORKS, FOR USE IN A FORCE REBALANCE SYSTEM

[75] Inventor: Romeal F. Asmar, Concord, Calif.

[73] Assignee: Systron Donner Corporation, Concord, Calif.

[22] Filed: June 3, 1974

[21] Appl. No.: 476,063

Related U.S. Application Data
[63] Continuation of Ser. No. 307,109, Nov. 16, 1972, abandoned.

[52] U.S. Cl. .................. 318/676; 318/634; 318/687
[51] Int. Cl.² ........................................ G05B 11/01
[58] Field of Search .................... 318/634, 676, 687

[56] References Cited
UNITED STATES PATENTS

| | | | |
|---|---|---|---|
| 2,680,222 | 6/1954 | Schwieg | 318/634 |
| 2,720,620 | 10/1955 | Power | 318/676 |
| 2,776,397 | 1/1957 | McWilliams | 318/632 X |
| 2,844,775 | 6/1958 | Miller et al. | 318/634 |
| 3,102,217 | 8/1963 | Bullen | 318/634 |
| 3,122,688 | 2/1964 | Houpt | 318/634 |
| 3,136,218 | 6/1964 | Tripp | 318/39 X |
| 3,164,759 | 1/1965 | Connors et al. | 318/632 X |
| 3,579,073 | 5/1971 | Johnstone et al. | 318/634 |
| 3,646,420 | 2/1972 | Halfhill et al. | 318/634 |

*Primary Examiner*—T. E. Lynch
*Attorney, Agent, or Firm*—Flehr, Hohbach, Test, Albritton & Herbert

[57] ABSTRACT

Bias and scale factor compensation networks for use with transducers which provides compensation in the transducer output for temperature induced output bias and scale factor changes. The network includes a temperature sensitive element fabricated from a high resistivity material with a high linear temperature coefficient of resistivity when linear compensation is required. The compensation network includes thermistors and scaling resistors when non linear compensation is required. Provision is made for positive or negative correction for bias and scale factor dependent only on the choice of circuit connection and the point of monitoring the circuit output.

21 Claims, 4 Drawing Figures

BIAS AND SCALE FACTOR TEMPERATURE COMPENSATION NETWORKS, FOR USE IN A FORCE REBALANCE SYSTEM

BACKGROUND OF THE INVENTION

This is a continuation of application Ser. No. 307,109, filed Nov. 16, 1972, now abandoned.

The present invention relates to an electronic bias and scale factor temperature compensation network to generate a corrective signal for modifying the output signal from a transducer to compensate for errors induced by temperature changes.

It is well known that structural members and electrical circuit components all possess characteristics which are sensitive to variations in temperature at least to some extent. Structural members contain internal stresses arising from the manner in which they were fabricated. Electrical components exhibit variations in electrical characteristics due to temperature induced stress change or characteristics directly and predictably related to environmental temperature. For example, in a fluid filled transducer an output bias change is experienced as a function of temperature due to stresses set up or relieved in the mechanical structure. Scale factors in such an instrument are susceptible to change as a function of temperature as the flotation fluid density varies over the temperature range if it contains a seismic mass sensitive to the quantity being measured. The buoyant effect on the floated mass changes providing a variation in equivalent weight of the mass member affecting the sensitivity of the transducer to the quantity being measured.

Errors induced in transducer outputs due to temperature changes generally represent gross error in the output. Attempts heretofore made to adequately compensate for such error have not been satisfactory in many applications particularly where there is a requirement to operate over widely varying temperature ranges. There is therefore a need for a new and improved bias and scale factor temperature compensation network, transducer using the same, and method.

SUMMARY AND OBJECTS OF THE INVENTION

The present invention is directed toward circuit means for providing bias and scale factor temperature compensation signals to be used with a transducer. The transducer has a mechanical structure including means forming a magnetic field, pickoff means, and means supplying an excitation signal to the pickoff. The mechanical structure contains parts in which temperature changes induce internal stress relief or generation causing output to appear from the pickoff in the absence of the quantity to which the transducer is designed to be sensitive. Temperature changes induce changes in magnetic field strength and in some of the characteristics of the various components. These latter changes may cause pickoff output signals at variance with those signals which were designed to appear in the presence of specified levels of the quantity being measured by the transducer. The former change is not a function of transducer sensitivity and must be compensated by means producing a signal designed to negate the individual bias-temperature output characteristics of the transducer. The latter change is a function of the transducer sensitivity and must be compensated by generating a signal affecting sensitivity which will negate the temperature induced error. Signals generated to compensate for the electrical components in the output signal induced by temperature bias sensitivity and scale factor sensitivity are delivered to the transducer output, rendering it apparently insensitive to temperature induced change in both bias and scale factor.

In general it is an object of the present invention to provide a bias and scale factor temperature compensation network displaying transducer outputs substantially independent of environmental temperature over temperature ranges.

Another object of the present invention is to provide a bias and scale factor temperature compensation network for correction of transducer output which does not substantially load the transducer output circuit.

Another object of the present invention is to provide a bias and scale factor temperature compensation network producing correction for transducer output temperature characteristics which are linear or non linear.

Another object of the present invention is to provide a bias and scale factor temperature compensation network producing correction for transducer output variations of either polarity and of varying magnitude depending upon the requirements of the individual transducer.

Another object of the present invention is to provide a method for bias and scale factor temperature compensation in a transducer which involves computing compensation component values and which is adaptable to any kind of transducer temperature characteristics.

Additional objects and features of the bias and scale factor temperature compensation network will appear from the following description in which the preferred embodiment has been set forth in detail in conjunction with the accompanying drawings.

DESCRIPTION OF THE PREFERRED EMBODIMENTS

The output bias and scale factor temperature compensation circuit and transducers for use therewith described herein have as their purpose the provision of corrective signals to the output of the transducer for the distinct temperature sensitive output characteristics related to bias and scale factor. The term bias as used herein refers to a shift in output which is not a function of transducer sensitivity, but is wholly a function of internal structural characteristics and their variation with temperature. The term transducer sensitivity as used herein refers to the ratio of response or change in output to the change in transducer stimulus or change in input. The term scale factor as used herein is synonymous with sensitivity. It is that ratio which when multiplied by the input magnitude is equivalent to the output indication. Scale factor is sensitive to temperature variations due to changes in physical characteristics within the transducer which contribute to the output sensitivity of the transducer.

Figure 1:
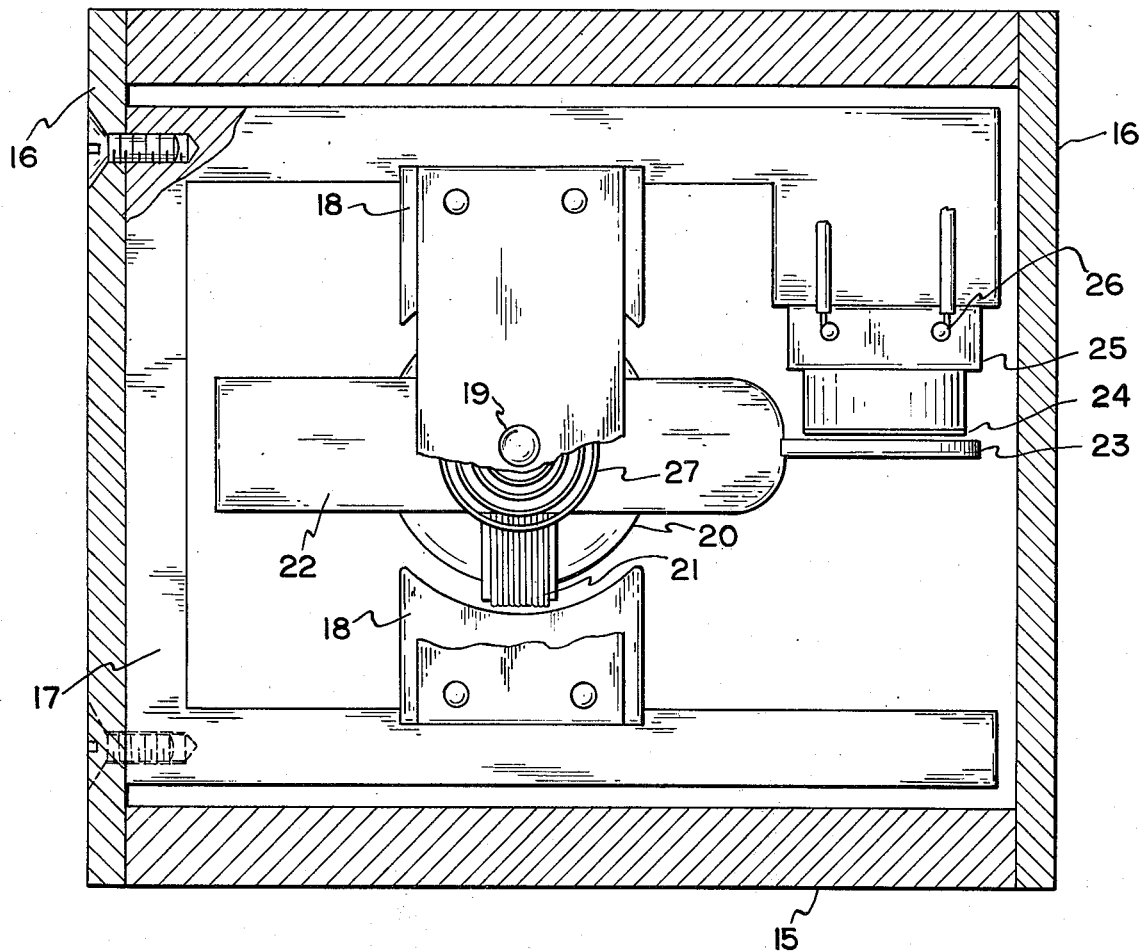
FIG. 1 is a sectional view of a typical transducer for use with the bias and scale factor temperature compensation network.

Referring to FIG. 1 there is shown a cross section of a typical transducer of the type associated with the bias and scale factor temperature compensation circuit. An outer case 15 having means to enclose the ends 16 contains an internally mounted framework 17 generally but not always of some metallic material. Framework 17 is adapted to mount pole pieces 18 and to carry pivots 19. A permanent magnet 20 is also mounted within the framework 17. A movable restoring coil 21 is supported between the pivots 19 and has attached thereto an arm 22. A paddle 23 is affixed to one end of the arm 22 and is disposed adjacent to a pickoff coil 24. Pickoff coil 24 is supported on pickoff support 25 carrying pickoff terminals 26. A hairspring 27 is mounted between the restoring coil 21 and the framework 17 on each end of the pivot axis and serves to transfer electrical energy from the circuitry mounted on the framework 17 to the movable coil 21.

The pickoff coil 24 is constructed of very fine wire forming an inductive coil. The paddle 23 disposed adjacent thereto is position sensitive to a quantity being measured by the transducer and is caused to move relative to the pickoff coil when the quantity is present. The pickoff coil is excited by an AC source (not shown) and produces an output when the paddle is displaced. The output is detected and used to produce an output signal from the transducer and also to energize the movable coil 21 to return the paddle 23 to its neutrally disposed position adjacent the pickoff coil 24.

It can be seen that there are structural components which may set up or relieve internal stresses or display differential growth as a function of temperature. It may also be seen that there are electrical and magnetic components which formulate the output of the transducer and which may also be sensitive to temperature change. Subsequent transducer null and sensitivity changes occur as temperature varies. These changes will be discussed hereinafter as changes in transducer output bias and scale factor. The transducer may contain a flotation and damping fluid within the case 15 which displays a varying density over the temperature range. When an internal member sensitive to the transduced quantity is supported in such a fluid the transducer scale factor is obviously changed as the temperature changes.

Figure 2:
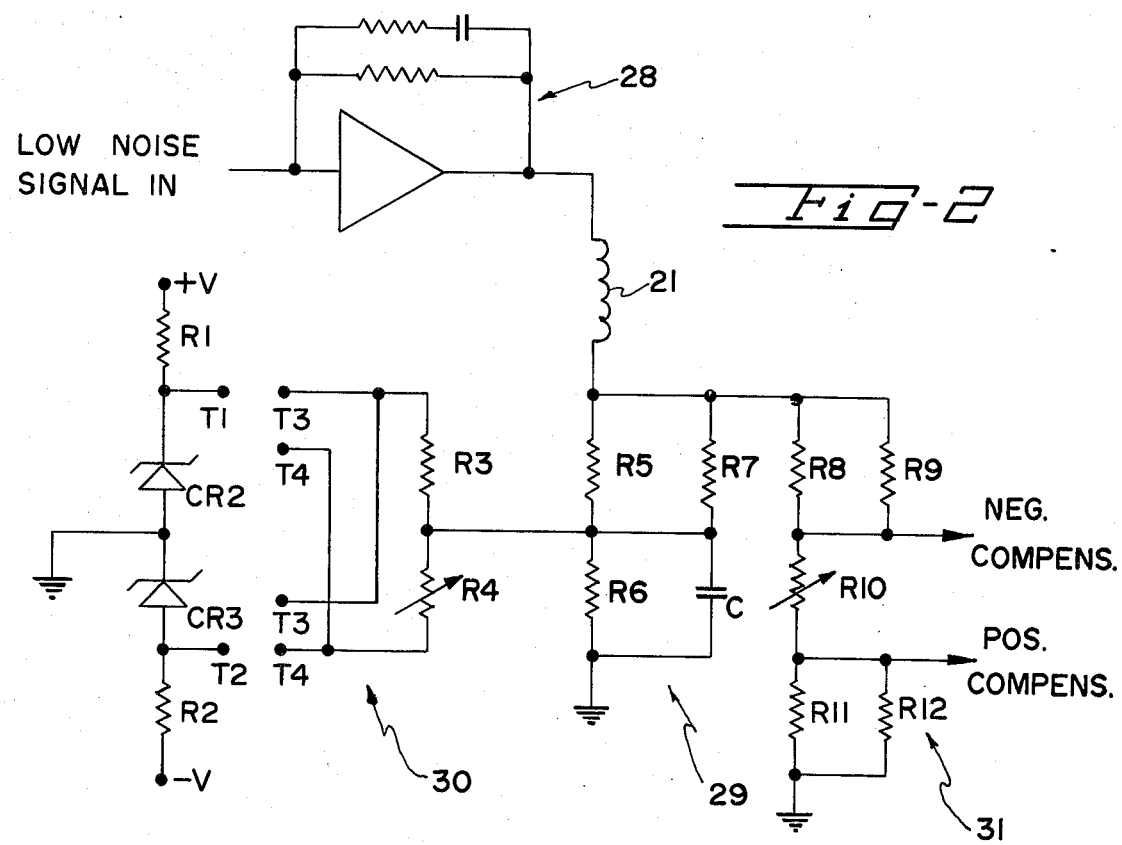
FIG. 2 is a schematic diagram of the bias and scale factor temperature compensation network with linear bias compensation.

Referring to FIG. 2 there is shown an amplification and response circuit 28 which operates on the signal produced by the low noise circuit for use with transducers disclosed in copending application, Ser. No. 307,110 filed Nov. 16, 1972. The movable restoring coil or torque coil 21 receives the amplified low noise signal and delivers it to a transducer. load circuit 29. An output bias compensation circuit 30 provides a signal to the load circuit 29 which negates the effect of transducer bias temperature sensitivity. The transducer output compensated for bias temperature sensitivity is delivered to an output scale factor compensation circuit 31 which provides compensation for transducer scale factor sensitivity to temperature. As shown in FIG. 2 the fully compensated transducer output is taken from one point in the scale factor compensation circuit 31 when negative scale factor compensation is desired and from another when positive compensation is desired.

The bias compensation circuit 30 is shown as having positive and negative regulated voltage supplies with one end common. In this embodiment voltage regulation is obtained through the use of a resistor and zener diode in series from each supply to the common point. Resistor R1 and zener CR2 are shown from the positive supply to common providing a regulated voltage at terminal T1 determined by the reverse breakdown level of CR2. In like manner zener CR3 and resistor R2 provide a regulated negative voltage at terminal T2. Terminal T1 may be connected to either terminals T3 or T4 depending on the polarity of the bias correction desired. Terminal T2 is connected to the remaining terminal T4 or T3. R3 is a resistor adjustable manually for room temperature bias correction. R4 is a temperature sensitive resistance element having high resistivity and a high linear temperature coefficient of resistance.

Resistor R5 in the transducer output load circuit 29 is subject to coarse adjustment by selection of resistor R7. Resistor R6 provides a signal level separation from common at the low end of the R5 – R7 combination. The junction for resistors R5, R6 and R7 is the point in the transducer output load circuit 29 where temperature bias compensation signals of either polarity may be injected.

Turning now to the manner in which the circuit adjustments are performed for linear temperature bias compensation reference is made to FIG. 2. Output bias change over the temperature range appears as an electrical component included in the output signal which is related to differential part growth with temperature between adjacent structural parts and/or stress imposition or relief internally in the structural parts as a function of temperature. Dimensional instability due to temperature variation may occur in the hairsprings 27 for example or in flexural support members. This bias change may occur either positively or negatively and may appear as a non linear function as well as a linear function of temperature. Initially the uncompensated output bias characteristic over the temperature range must be determined for an individual transducer. If, for example, the bias/temperature characteristic is found to be linear in nature and positive in slope, a compensation signal linear in nature and of the same but negative slope would be required. To achieve this a voltage divider with first and second sections represented by R3 and R4 respectively in FIG. 2 is excited by the regulated voltages by connecting terminal T1 to terminal T4 and terminal T2 to terminal T3.

The resistive material used to fabricate the temperature sensitive resistor R4 in this embodiment has a positive termperature coefficient of resistance of approximately 1950 parts per million per degree Farenheit. As temperature rises the resistance in R4 also rises. In this example the high end of resistor R is strapped to a positive regulated voltage at terminal T1. Visualizing a current I through resistor R4 at room temperature and presuming initial null output at room temperature is obtained at the value desired through manual adjustment of resistor R3, the analysis does not suffer by further presuming the voltage divider consisting of R3 and R4 is balanced at room temperature. An incremental temperature rise causes an incremental resistance rise in R4 of $\Delta R4$ and the conventional current through the path R4 and R6 to common must reduce to a value $$I - \Delta I = \frac{+V}{\Delta R4 + R4 + R6}$$

The path from common through R6 and R3 to the negative regulated supply is undisturbed by temperature. The current through this latter path maintains the room temperature value I. The differential current increment ΔI must flow in the conventional direction from common through R6 to the negative supply. The proper increment ΔI is obtained by carefully choosing the value of R4 with $\Delta R4 = f(T)$ known. A negative voltage appears, in this example, at the junction of resistors R5 and R6 which is equivalent to the product of ΔI and R6. A rise in the uncompensated transducer null output voltage at the positive side of load resistor R5 is pulled down by an amount IR6, calibrated to be equivalent to the uncompensated rise, and presenting a stable null output at the positive side of R5 when referenced to common.

Compensation for a linear transducer bias characteristic with negative slope over temperature can be seen to be achieved by connecting terminal T1 to T3 and terminal T2 to T4. R4 is then strapped at one end to a negative regulated voltage at terminal T2. As described before, a rise in temperature causes a rise in the resistance of R4 and a reduction in the current through the R4 and R6 path to the negative supply of an incremental amount ΔI. The regulated positive voltage at terminal T1 causes a current I to flow in a conventional direction through R3 and R6 to common which is unaffected by temperature. The net incremental current ΔI must flow in a conventional direction through R6 toward common to satisfy the condition of an incremental drop in current through R4. In this manner the node between resistors R5 and R6 is raised above common by the voltage ΔIR6 which represents the temperature bias compensation signal. The output voltage at the positive side of R5 is combined with the compensation signal by injecting the latter signal at the low end of R5, maintaining the output voltage at a constant level relative to common by pushing it up an amount ΔIR6. The compensation signal rise is calibrated to be equivalent to the uncompensated fall in bias due to temperature rise providing a temperature stabilized null output.

Transducer output voltage compensated for room temperature and temperature sensitive output bias is delivered to the output scale factor compensation circuit 31. Scale factor compensation circuit 31 provides a voltage dividing function and contains first, second and third sections in series. Resistors R8 and R9 provide a fine adjustment in the first section of the voltage divider. In like manner resistors R11 and R12 provide a fine adjustment in the third section of the voltage divider. One of the third section junctions is connected to common. Resistor R10 is contained in the second section of the divider and is made of a high resistivity material with a temperature coefficient of resistance of approximately 1,950 PPM/°F. The same type material used for resistor R4 in the bias compensation circuit 30 may be used for R10 in network 31 when linear scale factor compensation is desired. In the event a non-linear scale factor compensation is required the second section may contain a resistor-thermistor combination to provide the desired shape of temperature-output compensation voltage relationship to achieve output stability over temperature. When the second section of the scale factor compensation circuit comprises a resistance with a positive coefficient of resistance the output voltage with scale factor temperature sensitivity compensation added is derived from the first and second section junction when scale factor decreases with increasing temperature and from the second and third section junction when scale factor increases. For the situation where the second section comprises a resistance with a negative coefficient of resistance, such as the non-linear thermistor-resistor combinations, the compensated output signal is derived from the first and second section junction when scale factor increases with increasing temperature and from the second and third section junction when it decreases with increasing temperature.

Turning now to the operation of output scale factor compensation circuit 31 as mentioned above the circuit provides a voltage divider for the transducer output which consists of three sections in this embodiment. The transducer output signal generally contains an additional electrical component arising from changes in electrical characteristics of components in the output circuit or of mechanical characteristics which affect the sensitivity of the transducer. This additional electrical component is generally a linear function of temperature. A linear compensation with an infinitely adjustable slope positive or negative is therefore adequate. For example, in a transducer utilizing the response of a seismic mass to acceleration, a flotation fluid may be used to provide damping. Flotation fluids with useful viscosities vary in density over the temperature range. One such substance has a density at room temperature of approximately 1. The density varies at 0.1% per degree centigrade. If an object with the density of 3 grams per cubic centimeter is immersed in such a fluid the apparent density becomes 2 grams per cubic centimer due to the buoyancy effect of the fluid on the object.

The object representing the seismic mass appears to have a mass variance as a function of temperature due to the fluid density being a function of temperature. The net effect is a variation in mass in this case of 0.033% per degree centigrade of the true mass of 3 grams or 0.05% per degree centigrade of the remaining 2 grams per cubic centimeter. Since it is the apparent mass in the fluid which determines sensitivity a 0.05% per degree centigrade change in the sensitivity of the transducer output will occur. The scale factor, being defined as synonymous with sensitivity, obviously changes as temperature changes. This represents a gross temperature error in many applications for which compensation must be provided. Other transducer component characteristics may vary with temperature such as the field strength of a magnet which may be used in a sensing circuit or in conjunction with a restoring coil in a servo loop thereby changing transducer scale factor.

Scale factor variation with temperature differs in slope and contour in different instruments and may exhibit a positive or a negative tendency. For example if resistor R10, has a positive temperature coefficient of resistance, it rises in resistance value with increase in temperature. Assuming the transducer output signal is above common, the voltage at the junction between the first and second sections rises with temperature. The voltage at the junction between the second and third sections falls with rising temperature. The absolute value of second section resistor R10 is selected to achieve the desired slope of compensation signal as a function of temperature at either the high or the low junction. With knowledge of the scale factor variation slope the desired slope of the compensation signal is achieved by selection of the absolute value of R10 together with the fine adjustments provided in the first and third sections of the scale factor voltage divider. Negative compensation in FIGS. 2 and 3 refers to that provided for transducer scale factor decreasing with increase in temperature and consists of an increasing compensation signal with increase in temperature. A transducer scale factor increasing with temperature increase is compensated by taking the output from the terminal marked positive compensation in FIGS. 2 and 3 and consists of a decreasing signal as temperature increases. As in the case of bias temperature compensation, the compensation signal for scale factor temperature variation is provided with a slope equal and opposite to that displayed by the uncompensated transducer scale factor variation over the temperature range.

The method used for determining the absolute values of the R8 – R9 combination, R10, and the R11 – R12 combination in the three divider sections involves constructing a partial differential equation for the network including the transducer load circuit 29 and the scale factor compensation circuit 31, setting the equation equal to zero and solving for the three sections of the voltage divider container in circuit 31. The absolute value and consequent excursion over the temperature range of resistor R10 is determined to provide an approximate slope for scale factor compensation. The precomputed resistor vlaues are installed in the circuit and fine adjustment made to the first and third sections to obtain the precise compensation providing a temperature stable scale factor. As mentioned before when a positive coefficient of resistance element is in the second section the transducer output is taken from the low end of resistor R10 for an increasing scale factor change with increase in temperature and from the high end of resistor R10 for decreasing change in scale factor with increase in temperature.

Figure 4:
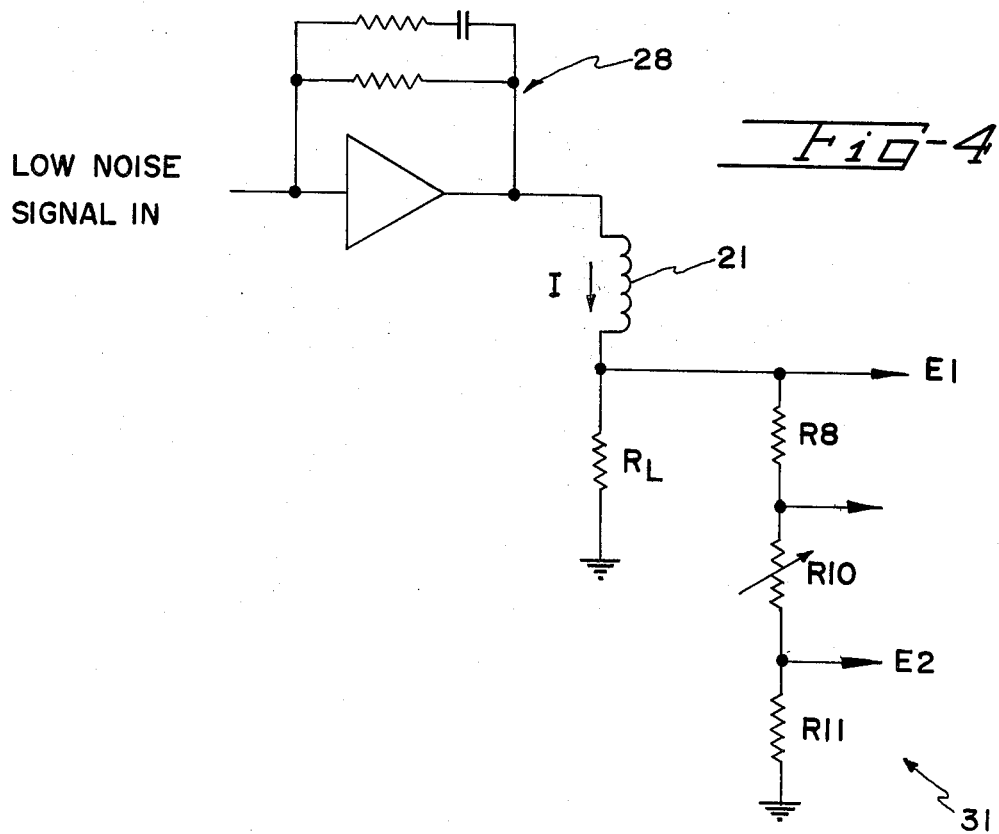
FIG. 4 is a simplified schematic diagram for illustration of scale factor compensation techniques.

The equation involved in arriving at the partial differential equation may best be seen by referring to the simplified scale factor compensation network 31 seen in FIG. 4. The current through the movable restoring coil or torque coil 21 is represented by the symbol I. The following relationship applies.

$$E_2 = E_1 \frac{R11}{R8 + R10 + R11} = I \frac{(R_L) R11}{R_L + R8 + R10 + R11}$$

The partial differential equation for the dependent variable $E_2$ is constructed with respect to the independent variables $I$, $R_L$, $R8$, $R$, and $R11$. Temporarily the variation in $R8$, $R_L$ and $R11$ is assigned a zero value. Setting the remaining portion of the partial differential equation equal to zero the relationship below appears:

$$R_L + R8 + R10 + R11 = \frac{\Delta R10}{\Delta I}$$

The allowable attenuation of $E_1$ in arriving at an output $E_2$ with a stable scale factor over the temperature range dictates the values of all the components in the latter equation except resistor R10. R10 and $\Delta R10$ are interrelated quantities for a given temperature range and are found from the latter equation. One material exhibiting the characteristics necessary for the linear temperature compensation resistors is identified by the trade name FENICOLOY. This material has sufficiently high resistivity to be useful in this type of application and has a temperature coefficient of resistance of 1950 PPM/°F. Wire of this type having a 1 mil diameter has been used in compensation circuits of the type disclosed herein, attaining output temperature variation as low as 0.003% per °C. Non-linear compensation can be provided by utilizing thermistors in conjunction with R10 in the manner discussed for non-linear bias compensation discussed below. It should be noted that in this latter case the compensation polarity is then opposed to that shown in FIGS. 2 and 3 as explained above.

Figure 3:
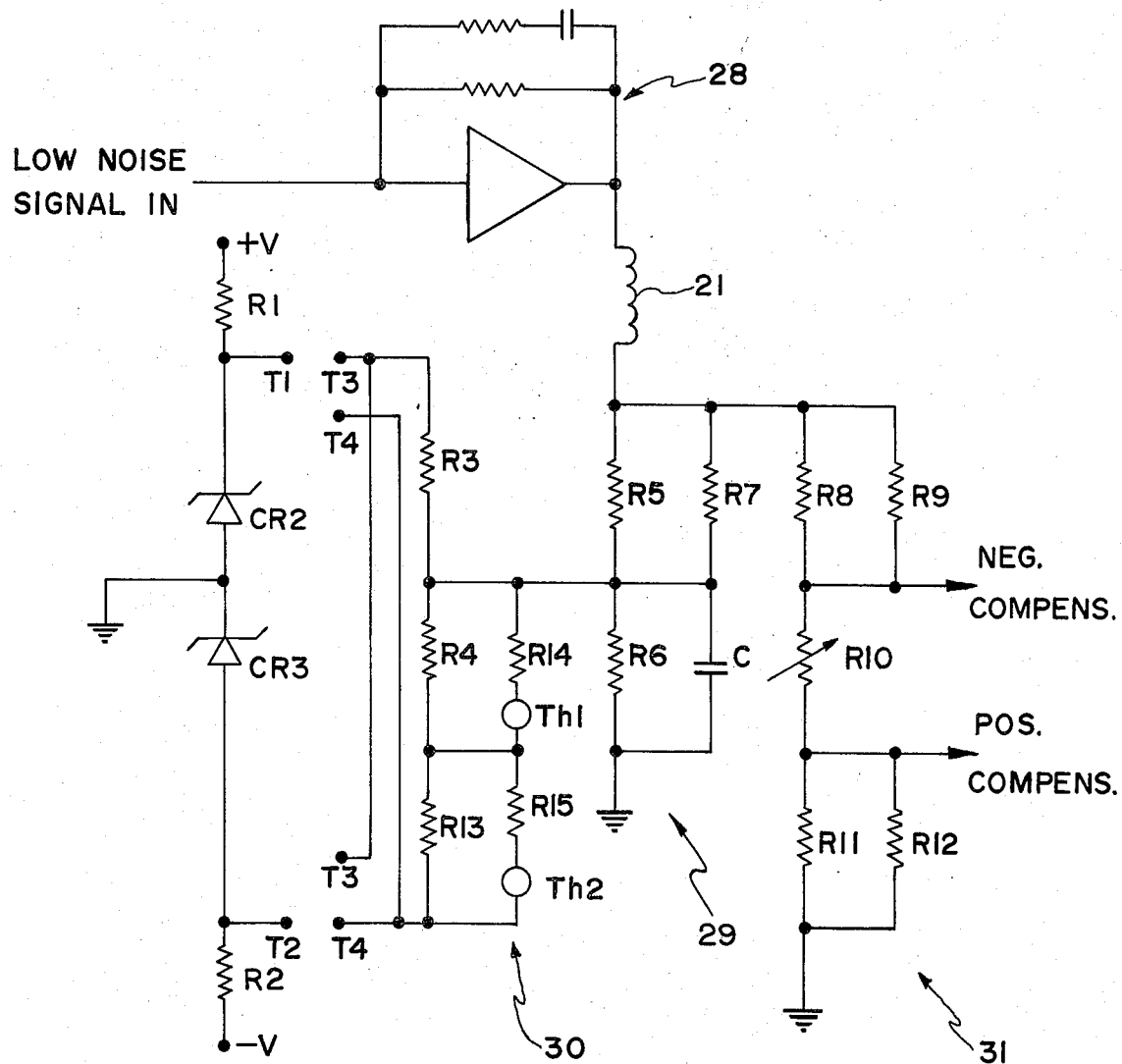
FIG. 3 is a schematic diagram of the bias and scale factor temperature compensation network with non linear bias compensation.

Turning now to FIG. 3 the description of the compensation network is identical to that given for FIG. 2 with the exception of one portion of the bias compensation circuit 30. Resistor R4 in FIG. 2 is replaced by the resistor-thermistor network comprising resistors R4, R13,R–, and R15, and thermistors TH1 and TH2. Whereas resistor R4 in FIG. 2 provided linear bias temperature compensation, the aforementioned network in FIG. 3 provides non-linear bias temperature compensation. The selection of resistor and thermistor combinations is made to provide a compensation signal with the temperature dependent shape substantially identical to that displayed by the uncompensated transducer bias sensitivity temperature in a fashion well known to those skilled in the art. The compensation signal is applied to the transducer output with a polarity opposite to that observed in the electrical component induced in the transducer output as a result of transducer temperature bias sensitivity.

The principle involved in non-linear temperature bias compensation is identical to that dicussed above for linear bias compensation. The resistance of circuit 30 in FIG. 3 is constructed to change as a function of temperature through selection of the components in circuit 30 to substantially coincide with the transducer temperature-bias characteristic. The slope of the temperature-bias characteristic in circuit 30 is reversed relative to the transducer temperature-bias characteristic in the same manner as that described above for linear compensation. It should be noted that the general thermistor characteristic displays a decrease in resistance with a rise in temperature which is opposite to that displayed by the high resistivity material with the positive temperature coefficient of resistance discussed in the description of linear bias compensation and scale factor compensation. This indicates that an increasing compensation signal from circuit 30 to counteract a negative transducer temperature-bias characteristic would require connection between terminals T1 and T4 and between terminals T2 and T3 in circuit 30. In this instance a rise in temperature produces an incremental additional current through the temperature sensitive element which by Kirchoff's law is seen to flow in a conventional direction through R6 to common, raising the potential between R5 and R6 in load circuit 29 by the product of the incremental current and the resistance R6. Using the reasoning disclosed above it follows that decreasing compensation from circuit 30 may be provided for an increasing transducer temperature-bias characteristic by connecting the regulated power supply voltages to the bias compensation voltage divider from terminal T1 to T3 and terminal T2 to T4.

In the circuit 30 of both FIGS. 2 and 3 the initial electrical zero or null adjustment is made by adjusting resistor R3. R3 then becomes a fixed resistor for the life of the transducer under normal circumstances. The transducer output which is compensated for transducer temperature-bias error is that appearing at the output circuit junction of the movable restoring coil 21 and transducer load circuit 29. The purpose is to maintain the output junction at a constant null signal level relative to common as temperature varies. The principle involved is to achieve the purpose by pushing the junction between resistors R5 and R6 above or pulling it below a common potential causing the output junction at the opposite end of R5 to follow. This manner of providing compensation for transducer temperature-bias error does not substantially load the transducer load circuit 29. For the sake of simplicity in revealing the principle, the foregoing description of the compensation technique for bias variation with temperature does not discuss the loading effect inherent upon addition of the scale factor temperature compensation circuit 31. This effect and the means of controlling it are discussed here. Referring to FIG. 2 the current through R6 which raises or lowers the R5 − R6 junction voltage can be seen to have a parallel path when scale factor compensation circuit 31 is added. A current through circuit 31 in series with the R5 − R7 parallel combination will flow whenever the R5 − R6 junction is displaced from common. This "loading" effect causes the voltage injected at the junction of R5 − R6 to be of smaller magnitude than in the unloaded condition as explained below. This requires a greater compensation signal than when the scale factor circuit 31 is not present, which in turn requires a greater excursion of resistor R4 with temperature.

In FIG. 2 the additional compensation current is proportional to the ratio $$\frac{R6}{R31 + \frac{(R5)(R7)}{R5+R7} + R6}$$

as a first approximation where R31 is the impedance of circuit 31. This also represents the proportion of the unloaded compensation current ΔI which flows through the path parallel to the R6 path. That portion of the original ΔI which is proportional to $$\frac{R31 + \frac{(R5)(R7)}{R5 + R7}}{R31 + \frac{(R5)(R7)}{R5 + R7} + R6}$$

remains to pass through R6. This can be seen to generate a voltage less than ΔIR6. Therefore the potential at the junction of R5 − R6 must be displaced farther from common by an amount sufficient to cause the current through R6 to regain the full original ΔI value. To obtain this result a greater resistance change per unit of temperature change must be seen in resistor R4 as mentioned above.

Output from a transducer is provided through the use of the disclosed bias and scale factor compensation network which is substantially independent of environmental temperature over reasonalble temperature ranges. Compensation is provided for output variation as a function of temperature which is either linear or non-linear and which may display increasing or decreasing tendencies in an individual transducer.

I claim:

1. In a transducer, a mechanical structure having means forming a magnetic field, said mechanical structure having mechanical parts in which temperature dependent dimensional changes cause flexing therein, a movable restoring coil disposed in the magnetic field, a paddle carried by the restoring coil, a pickoff disposed on the mechanical structure adjacent to the paddle, means supplying a signal to the pickoff, a detector connected to the pickoff and providing an output signal, said output signal being coupled to said restoring coil and having therein an electrical component which is related to the temperature induced flexing in said mechanical parts, circuit means located adjacent said mechanical structure having at least one circuit component subject to predetermined change in resistance value related to temperature change, means for energizing said circuit means connected thereto so that said one circuit component provides an electrical bias compensation signal substantially equal and opposite in polarity to said electrical component in said output signal, and means combining said output signal and said electrical bias compensation signal whereby the combined signal is substantially free of temperature induced bias change.

2. A transducer as in claim 1 in which said pickoff has magnetic characteristics in which temperature changes cause temperature dependent flux density variation, and wherein said output signal has an additional electrical component which is related to the temperature induced flux density variation, additional circuit means mounted proximate to said pickoff so that said additional circuit is exposed to substantially the same temperature as said pickoff, an additional circuit component in said additional circuit means subject to predetermined change in resistance value related to temperature change for providing a scale factor compensation signal substantially equal and opposite in polarity to said additional electrical component in said output signal, and means coupling the scale factor compensation signal to the output signal whereby the output signal is substantially free of temperature induced scale factor change.

3. A transducer as in claim 2 together with liquid means having a predetermined density contained within the mechanical structure, said predetermined density being subject to temperature induced changes, said temperature induced density changes causing changes in apparent mass of said movable restoring coil and paddle, whereby a portion of said additional electrical component is related to the temperature induced changes in density said additional circuit component providing an additional scale factor compensation signal equal and opposite to said portion of said additional electrical component.

4. A transducer as in claim 1 wherein said means for energizing said circuit means comprises positive and negative regulated sources for providing supply voltage for said circuit means, and wherein said circuit means includes means for manual adjustment to provide corection for room temperature output bias.

5. A transducer as in claim 4 wherein said circuit means includes linear resistive means having a positive temperature coefficient of resistance providing linear bias compensation with temperature and wherein said means for manual adjustment has a resistance which is substantially insensitive to temperature variation.

6. A transducer as in claim 4 wherein said circuit means comprises thermistors and scaling resistors providing non-linear bias compensation with temperature.

7. In a transducer as, a mechanical structure having means forming a magnetic field, said mechanical structure having parts in which temperature changes cause flexing therein, a restoring coil disposed in the magnetic field, a paddle carried by the restoring coil, a pickoff disposed adjacent to the paddle, means supplying a signal to the pickoff, a detector connected to the pickoff and providing an output signal, said output signal having therein an electrical component which is related to the temperature induced flexing in said mechanical parts, circuit means for providing an electrical bias compensation signal substantially equal and opposite in polarity to said electrical component in said output signal, means combining said output signal and said bias compensation signal, whereby the resulting signal is compensated for temperatuure induced bias change, said pickoff having magnetic characteristics in which temperature changes cause variation therein, said output signal having an additional electrical component which is related to the temperature induced change in said pickoff magnetic characteristics, additional circuit means providing a scale factor compensation signal substantially equal and opposite in polarity to said additional electrical component, means coupling the scale factor compensation signal to the output signal, said additional circuit including a voltage divider having first, second, and third sections connected in series, said first section being connected to said output signal and said third section being connected to common, said first and third sections having manually adjustable resistance means, and said second section responsive to temperature, said voltage divider operating to provide compensated output voltage for increasing scale factor with increasing temperature between said second and third sections and for decreasing scale factor with increasing temperature between said first and second sections.

8. In an output signal bias and scale factor temperature compensation circuit for use with transducers of the type having an electrical output and having structural parts with temperature induced flexing therein and electrical components with temperature induced changes therein, an output bias compensation circuit responsive to temperature providing a first signal substantially equal and opposite in polarity to that produced by temperature induced nechanical flexing of structural parts, an output scale factor compensation circuit reponsive to temperature for receiving said bias compensated output and providing a second signal substantially equal and opposite to that produced by temperature induced changes in electrical components, and means for combining said first and second signals with said electrical output whereby said combined electrical output is rendered substantially insensitive to temperature change.

9. In an output signal bias and scale factor temperature compensation circuit for use with transducers of the type having an electrical output and having structural parts with temperature induced flexing therein and electrical components with temperature induced changes therein, an output bias compensation circuit responsive to temperature providing a first signal substantially equal and opposite in polarity to that produced by temperature induced mechanical flexing of structural parts, an output scale factor compensation circuit responsive to temperature for receiving said bias compensated output and providing a second signal substantially equal and opposite in polarity to that produced by temperature induced changes in electrical components, means for combining said first and second signals with said electrical output, whereby said combined electrical output is rendered substantially insensitive to temperature change, said output bias compensation circuit including a voltage divider having first and second sections, positive and negative regulated sources for providing supply voltages for said divider, said first section of said voltage divider being insensitive to temperature variation for adjusting bias correction at room temperature, said second section of said voltage divider responsive to temperature variation, and said first signal arising at the junction between said first and second sections.

10. An output signal bias and scale factor temperature compensation circuit for use with transducers as in claim 9 wherein said second section of said voltage divider responsive to temperature variation comprises resistive means having a linear temperature co-efficient of resistance.

11. An output signal bias and scale factor temperature compensation circuit for use with transducers as in claim 9 wherein said second section of said voltage divider responsive to temperatre variation comprises thermistors and scaling resistors.

12. In an output signal bias and scale factor temperature compensation circuit for use with transducers of the type having an electrical output and having structural parts with temperature induced flexing therein and electrical components with temperature induced changes therein, an output bias compensation circuit responsive to temperature providing a first signal substantially equal and opposite in polarity to that produced by temperature induced mechanical flexing of structural parts, an output scale factor compensation circuit responsive to temperature for receiving said bias compensated output and providing a second signal substantially equal and opposite in polarity to that produced by temperature induced changes in electrical components, means for combining said first and second signals with said electrical output, whereby said combined electrical output is rendered substantially insensitive to temperature change, said output scale factor compensation circuit including a voltage divider having first, second, and third sections connected in series, said first section being connected to said electrical output and said third section being connected to common, said first and third sections having manually adjustable resistance means, and said second section having a resistance responsive to temperature, said voltage divider operating to provide output voltage compensated for increasing scale factor change with temperature between said second and third sections and for decreasing scale factor change with temperature between said first and second sections.

13. In an output signal bias and scale factor temperature compensation circuit for use with transducers of the type having an electrical output and having structural parts with temperature induced flexing therein and electrical components with temperature induced changes therein, an output bias compensation circuit responsive to temperature providing a first signal substantially equal and opposite in polarity to that produced by temperature induced mechanical flexing of structural parts, an output scale factor compensation circuit responsive to temperature for receiving said bias compensated output and providing a second signal substantially equal and opposite in polarity to that produced by temperature induced changes in electrical components, means for combining said first and second signals with said electrical output, whereby said combined electrical output is rendered substantially insensitive to temperature change, said output scale factor compensation circuit including a voltage divider having first, second, and third sections connected in series, said first section being connected to said electrical output and said third section being connected to common, said first and third sections having manually adjustable resistance means, and said second section having a resistance responsive to temperature, said voltage divider operating to provide output voltage compensated for increasing scale factor change with temperature between said first and second sections and for decreasing scale factor change with temperature between said second and third sections.

14. In a transducer, a mechanical structure having means forming a magnetic field, said magnetic field being subject to temperature induced flux density changes therein, a movable restoring coil disposed in the magnetic field, a paddle carried by the restoring coil, a pickoff disposed adjacent to the paddle, means for supplying an AC signal to the pickoff, a detector connected to the pickoff and providing an output signal, said output signal connected to said restoring coil and having therein an electrical component which is related to the temperature induced flux density changes, a voltage divider located proximate to said means forming a magnetic field and having first, second, and third sections connected in series, said first section being connected to said output signal and said third section being connected to common, said first and third sections having manually adjustable resistance means, and said second section having a resistance responsive to temperature, said voltage divider providing an electrical scale factor compensation signal substantially equal and opposite in polarity to said electrical component in said output signal, and means combining said output signal and said scale factor compensation, whereby the combined signal is compensated for temperature induced scale factor change.

15. A transducer as in claim 14 together with an external sealed case and liquid means having a predetermined density in communication with said mechanical structure, said liquid means density being changed by changes in temperature, said density changes causing changes in apparent mass of said movable restoring coil and said paddle, said electrical component thereby having an error component related to the liquid density changes, said electrical scale factor compensation signal including a component substantially equal and opposite in polarity to said error component related to the liquid density changes.

16. A transducer as in claim 14 wherein said second section has a positive temperature coefficient of resistance whereby said voltage divider operates to provide compensated output voltage for increasing scale factor with increasing temperature between said second and third sections and for decreasing scale factor with increasing temperature between said first and second sections.

17. In a transducer a mechanical structure having means forming a magnetic field, said last named means producing a field in which temperature changes induce flux density changes therein, a movable restoring coil disposed in the magnetic field, a paddle carried by the restoring coil, a pickoff disposed adjacent to the paddle, means for supplying a signal to the pickoff, a detector connected to the pickoff and providing an output signal, said output signal connected to said restoring coil and having therein an electrical component which is related to the temperature induced flux density changes, a voltage divider having first, second, and third sections connected in series, with said first section connected to said output signal and said third section connected to common, said first and third sections having manually adjustable resistance means, and said second section having a resistance responsive to temperature, said voltage divider providing an electrical scale factor compensation signal substantially equal and opposite in polarity to said electrical component in said output signal, means combining said output signal and said scale factor compensation signal, whereby the combined signal is compensated for temperature induced scale factor change, said second section having a negative temperature coefficient of resistance, whereby said voltage divider operates to provide compensated output voltage for increasing scale factor with increasing temperature between said first and second sections and for decreasing scale factor with increasing temperature between said second and third sections.

18. A method for bias and scale factor temperature compensation in output circuits for use with transducers having a contained magnetic field and having mechanical structure in which temperature change induces flexing therein, and an output signal from the transducer including a first electrical component in said output signal related to the temperature induced mechanical flexing, and a second electrical component in said output signal related to temperature induced variation in the contained magnetic field, comprising the steps of dividing positive and negative power supply voltages to obtain first and second voltages, adjusting said first voltage manually to provide room temperature bias correction, varying said second voltage in response to temperature for providing a signal substantially equal and opposite to said first electrical component in said output, combining said signal equal and opposite to said first electrical component with said output to compensate output bias variation with temperature, dividing the compensated transducer output voltage to obtain third, fourth and fifth voltages, varying said fourth voltage in response to temperature, and adjusting said third and fifth voltages manually to provide for fine adjustment of said signal equal and opposite to said second electrical component.

19. A method for bias and scale factor temperature compensation in output circuits as in claim 18 wherein the step of combining said signal equal and opposite to said first electrical component comprises the steps of connecting said signal equal and opposite to said first electrical component to the low side of said output signal for controlling the output signal at a constant null level by varying said low side.

20. A method for bias and scale factor temperature compensation in output circuits as in claim 18 wherein varying said fourth voltage comprises providing a positive temperature coefficient in said output to provide a signal equal and opposite to said second electrical component at the high side of said output for a decreasing second electrical component with increasing temperature, and at the low side of said output for an increasing second electrical component with increasing temperature.

21. A method for bias and scale factor temperature compensation in output circuits as in claim 18 wherein varying said fourth voltage comprises providing a negative temperature coefficient in said output to provide a signal equal and opposite to said second elelctrical component at the low side of said output for a decreasing second electrical component with increasing temperature, and at the high side of said output for an increasing second electrical component with increasing temperature.

* * * * *